US012756688B2

(12) United States Patent
Jin et al.

(10) Patent No.: US 12,756,688 B2
(45) Date of Patent: Oct. 6, 2026

(54) WIRELESS FLOW INSPECTION SOLUTION IN SD-WAN MULTI-DOMAINS

(71) Applicant: Cisco Technology, Inc., San Jose, CA (US)

(72) Inventors: Xi Jin, Shanghai (CN); Bo Sun, Shanghai (CN); Peng Wang, Shanghai (CN); Yangyang Shen, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 335 days.

(21) Appl. No.: 18/536,079

(22) Filed: Dec. 11, 2023

(65) Prior Publication Data

US 2025/0193154 A1 Jun. 12, 2025

(51) Int. Cl.
*H04L 9/40* (2022.01)
*H04W 12/08* (2021.01)
*H04W 84/12* (2009.01)

(52) U.S. Cl.
CPC ........ *H04L 63/0245* (2013.01); *H04L 63/101* (2013.01); *H04W 12/08* (2013.01); *H04W 84/12* (2013.01)

(58) Field of Classification Search
CPC .. H04L 63/0245; H04L 63/101; H04W 12/08; H04W 84/12
USPC .......................................................... 455/410
See application file for complete search history.

(56) References Cited

U.S. PATENT DOCUMENTS

2015/0381660 A1 12/2015 Hsiung et al.
2016/0227443 A1* 8/2016 Tomici .................. H04L 61/503
2017/0251065 A1 8/2017 Furr et al.
2020/0153701 A1* 5/2020 Mohan ................ H04L 12/2854
2020/0304372 A1* 9/2020 Henry ............... H04W 28/0226
2020/0389796 A1* 12/2020 Olofsson ............... H04L 67/125
2021/0036916 A1 2/2021 Szigeti et al.
2022/0141184 A1 5/2022 Oswal et al.
2022/0353190 A1 11/2022 Ramaswamy et al.
2024/0259277 A1* 8/2024 Chou ...................... H04L 67/51
2024/0267792 A1* 8/2024 Zhu ................... H04W 28/0236

* cited by examiner

*Primary Examiner* — Hirdepal Singh
(74) *Attorney, Agent, or Firm* — Rutan & Tucker, LLP; Ravi Mohan; Marc A. McClain

(57) ABSTRACT

Described herein are devices, systems, methods, and processes for inspecting wireless client traffic in a software-defined wide area network (SD-WAN) deployment. A controller device may generate and send capture policies to various network devices, including, but not limited to, access points (APs), wireless local area network (LAN) controllers (WLCs), and edge devices. The policies may each include a filter field and an action field, which can be dynamically updated based on current network conditions and needs. Upon receiving the capture policy, the APs can filter the wireless traffic and set an Inspect flag in the control and provisioning of wireless access points (CAPWAP) header on the matching wireless packet. The edge devices or WLCs may then inspect the wireless traffic by checking the Inspect flag in the CAPWAP header. The technique may provide a more efficient and scalable solution for inspecting wireless client traffic, with minimal impact on network performance.

17 Claims, 9 Drawing Sheets

WIRELESS FLOW INSPECTION SOLUTION IN SD-WAN MULTI-DOMAINS

The present disclosure relates to network traffic management. More particularly, the present disclosure relates to inspecting wireless client traffic in a software-defined wide area network (SD-WAN) deployment.

BACKGROUND

In the field of network traffic management, the use of software-defined wide area networks (SD-WANs) has become increasingly prevalent. The SD-WAN technology provides a way to configure and manage network traffic in a more flexible and efficient manner compared to traditional network management methods. It allows for centralized control of the network, dynamic path selection, and the ability to set policies for network traffic.

Debugging wireless issues, such as, but not limited to, client onboarding, forwarding, and roaming, is a common task for the edge router or wireless local area network (LAN) controller (WLC) devices. These devices are often equipped to inspect specific wireless client traffic. However, in an SD-WAN deployment, filtering specific client traffic can be challenging. This is because the medium access control (MAC) address of the wireless client is embedded in the control and provisioning of wireless access points (CAPWAP) payload, which is not readily filtered by an access control list (ACL). To filter the wireless traffic of clients, parsing the payload of the CAPWAP packet to identify the MAC address of the client is often needed.

Existing solutions for filtering wireless client MAC addresses on embedded WLC (eWLC) face several issues. First, the number of filters is not scalable, which can be problematic in large networks with numerous wireless clients. Second, the process can significantly impact performance. Wireless client MAC address filtering involves parsing the CAPWAP payload and comparing the four MAC addresses in the dot11 header and the two MAC addresses in the Ethernet header with each of the configured MAC address filters. For each packet and each configured wireless client MAC address filter, it may necessitate up to six comparisons to determine if the packet should be captured.

Third, in some scenarios, wireless client MAC address filtering may not capture all the desired packets. By way of a non-limiting example, with CAPWAP fragment packets, only the first CAPWAP fragment packets may be captured. Further, existing solutions do not support end-to-end wireless flow inspection in multi-domain SD-WAN deployments. This limitation can obstruct comprehensive network monitoring and troubleshooting. Therefore, there is a clear need for a more efficient and scalable approach for inspecting wireless client traffic in an SD-WAN deployment.

SUMMARY OF THE DISCLOSURE

Systems and methods for inspecting wireless client traffic in a software-defined wide area network (SD-WAN) deployment in accordance with embodiments of the disclosure are described herein. In some embodiments, a device includes a processor, at least one network interface controller configured to provide access to a network, and a memory communicatively coupled to the processor, wherein the memory includes a flow inspection logic. The logic is configured to receive an indication of one or more capture policies, receive a wireless local area network (WLAN) frame, generate a control and provisioning of wireless access points (CAPWAP) packet, the CAPWAP packet encapsulating the WLAN frame, identify whether the WLAN frame matches at least one capture policy of the one or more capture policies, and set an Inspect flag in a header of the CAPWAP packet.

In some embodiments, the indication of the one or more capture policies is received from a controller device.

In some embodiments, the WLAN frame is received from a wireless client.

In some embodiments, the Inspect flag is set in response to the WLAN frame matching the at least one capture policy.

In some embodiments, the flow inspection logic is further configured to forward the CAPWAP packet to a network device.

In some embodiments, the network device includes an edge device or a wireless local area network controller (WLC).

In some embodiments, the CAPWAP packet is forwarded to the network device via a software-defined wide area network (SD-WAN), the device is associated with a first network domain, the network device is associated with a second network domain different from the first network domain, and the first network domain and the second network domain communicate with each other via the SD-WAN.

In some embodiments, each capture policy in the one or more capture policies includes a filter portion and an action portion.

In some embodiments, a filter portion of a capture policy in the one or more capture policies includes a wireless client medium access control (MAC) address, and an action portion of the capture policy includes setting the Inspect flag.

In some embodiments, a filter portion of a capture policy in the one or more capture policies includes an access control list (ACL), and an action portion of the capture policy includes setting the Inspect flag and inspecting a flow.

In some embodiments, the ACL is associated with one or more dynamic host configuration protocol (DHCP) messages or one or more internet protocol version 6 neighbor discovery (IPv6ND) messages.

In some embodiments, the flow inspection logic is further configured to receive an indication of one or more additional capture policies from a controller device, and store the one or more capture policies and the one or more additional capture policies in the memory.

In some embodiments, the device includes an access point (AP).

In some embodiments, a device includes a processor, at least one network interface controller configured to provide access to a network, and a memory communicatively coupled to the processor, wherein the memory includes a flow inspection logic. The logic is configured to receive a control and provisioning of wireless access points (CAPWAP) packet, the CAPWAP packet encapsulating a wireless local area network (WLAN) frame, identify whether an Inspect flag is present in a header of the CAPWAP packet, and inspect the WLAN frame encapsulated in the CAPWAP packet in response to the presence of the Inspect flag in the header of the CAPWAP packet.

In some embodiments, the CAPWAP packet is received from an access point (AP) via a software-defined wide area network (SD-WAN), the AP is associated with a first network domain, the device is associated with a second network domain different from the first network domain, and the first network domain and the second network domain communicate with each other via the SD-WAN.

In some embodiments, the flow inspection logic is further configured to receive an indication of one or more capture policies from a controller device, and wherein the identifying of whether the Inspect flag is present and the inspecting of the WLAN frame are based on at least one capture policy of the one or more capture policies.

In some embodiments, the device includes an edge device or a wireless local area network controller (WLC).

In some embodiments, a device includes a processor, at least one network interface controller configured to provide access to a network, and a memory communicatively coupled to the processor, wherein the memory includes a flow inspection logic. The logic is configured to generate one or more capture policies associated with inspecting wireless local area network (WLAN) traffic, and transmit an indication of the one or more capture policies.

In some embodiments, the indication of the one or more capture policies is transmitted to at least one of an access point (AP), an edge device or a wireless local area network controller (WLC).

In some embodiments, the device includes a controller device.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
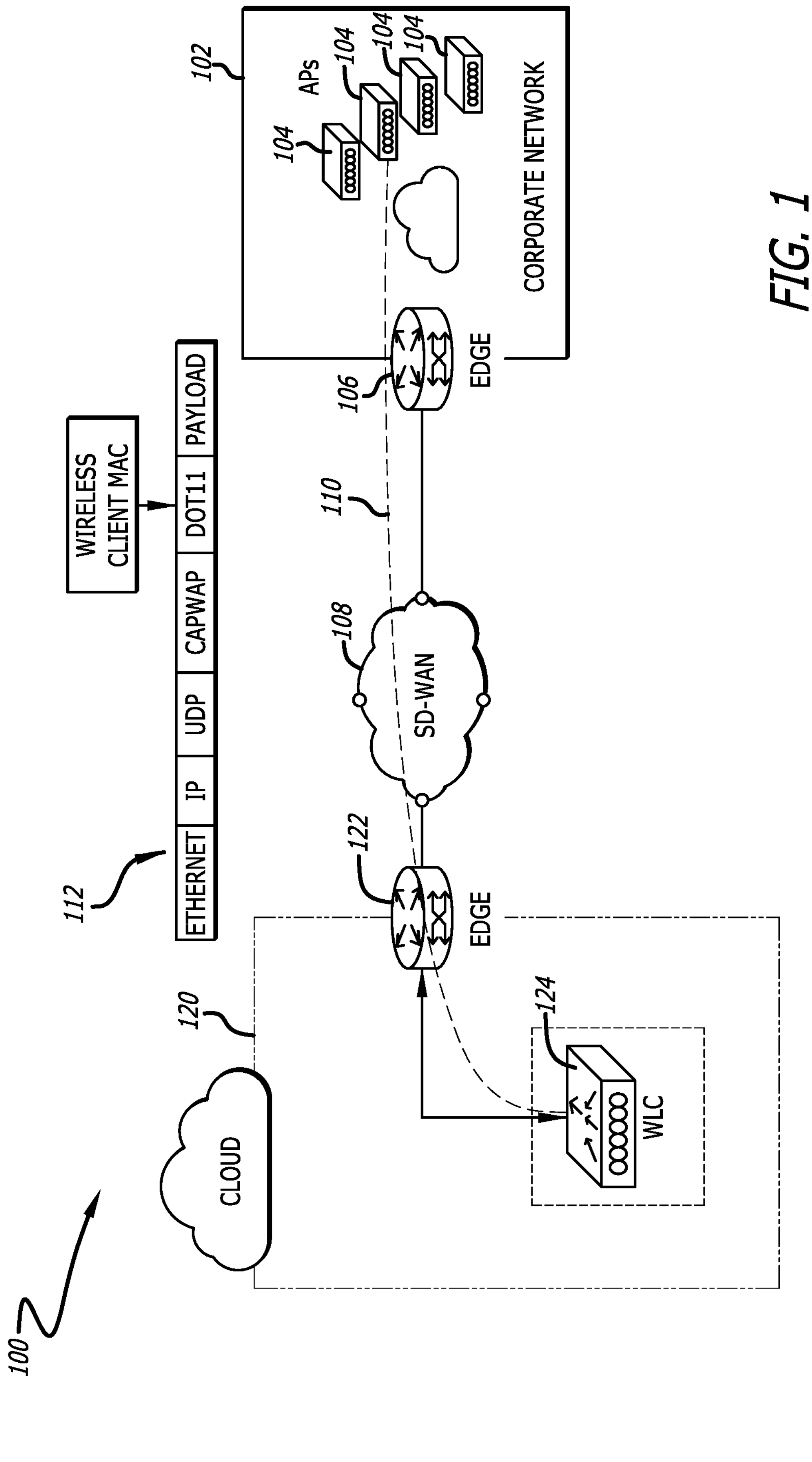
FIG. 1 is a diagram illustrating a network architecture in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that provide a more efficient and scalable solution for inspecting wireless client traffic in a software-defined wide area network (SD-WAN) deployment. In many embodiments, a controller device may generate and send capture policies to various network devices, including, but not limited to, access points (APs), wireless local area network (LAN) controllers (WLCs), and/or edge routers. In a number of embodiments, each capture policy can include two fields (portions): a "filter" field and an "action" field. The filter field can include a wireless client medium access control (MAC) address or an access control list (ACL) that controls traffic related to network protocols such as, but not limited to, dynamic host configuration protocol (DHCP) or internet protocol version 6 (IPv6) neighbor discovery (IPV6ND). The action field can include instructions to set an Inspect flag and/or to inspect the flow of network traffic.

In a variety of embodiments, when a new flow needs to be inspected, the controller device may send updated capture policies to the APs. In some embodiments, after receiving the capture policy from the controller device, the APs can filter the wireless traffic and set an Inspect flag in a header of the control and provisioning of wireless access points (CAPWAP) packet (e.g., the CAPWAP header) encapsulating the matching wireless packet. In more embodiments, the Inspect flag can be implemented by redefining a Reserved field in a CAPWAP header.

In additional embodiments, after receiving the capture policy from the controller device, the edge device (e.g., an edge router) or the WLC may inspect the wireless traffic by checking the Inspect flag in the header of the CAPWAP packets arriving from the APs. Accordingly, in further embodiments, in a multi-domain SD-WAN deployment, the inspect function of the SD-WAN devices can be triggered by the Inspect flag to provide a full network layer monitor view. In still more embodiments, by way of non-limiting examples, the techniques described herein can integrate with other capture tools such as, but not limited to, embedded packet capture (EPC), encapsulated remote switched port analyzer (ERSPAN), or Packet-trace.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom very large-scale integration (VLSI) circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a diagram illustrating a network architecture 100 in accordance with various embodiments of the disclosure is shown. The embodiments shown in FIG. 1 may include a first domain 102, which can represent a corporate network comprising multiple APs 104. A second domain 120, located in a cloud, may include a WLC 124. In many embodiments, the first domain 102 and the second domain 120 can communicate with each other via an SD-WAN 108 through an edge router 106 of the first domain and an edge router 122 of the second domain.

In a number of embodiments, a CAPWAP tunnel 110 may be established between the APs 104 and the WLC 124 via the edge router 106, the SD-WAN 108, and the edge router 122. CAPWAP is a standard, interoperable protocol that enables a controller to manage a collection of wireless APs. In particular, CAPWAP can encapsulate and transport wireless user data between APs and WLCs. In a variety of embodiments, CAPWAP packets 112 may be transmitted over the CAPWAP tunnel 110. Each CAPWAP packet 112 can includes, for instance, an Ethernet header, an internet protocol (IP) header, a user datagram protocol (UDP) header, a CAPWAP header, a dot11 (i.e., 802.11) header (which can include the wireless client MAC address), and a payload.

The existing solutions for inspecting wireless client traffic (e.g., implemented solely at the WLC 124) may face challenges in the setup shown in FIG. 1. In particular, the MAC address of the wireless client device may be embedded in the CAPWAP payload, which may not be readily filtered by an ACL. This can necessitate parsing the payload of the CAPWAP packets to identify the MAC address of the wireless client, which can be resource-intensive and may impact network performance.

Although a specific embodiment for a network architecture suitable for carrying out the various steps, processes, methods, and operations described herein is discussed with respect to FIG. 1, any of a variety of systems and/or processes may be utilized in accordance with embodiments of the disclosure. For example, the APs may be equipped with advanced filtering capabilities that enable them to parse the CAPWAP payload more efficiently. The elements depicted in FIG. 1 may also be interchangeable with other elements of FIGS. 2-9 as required to realize a particularly desired embodiment.

Figure 2:
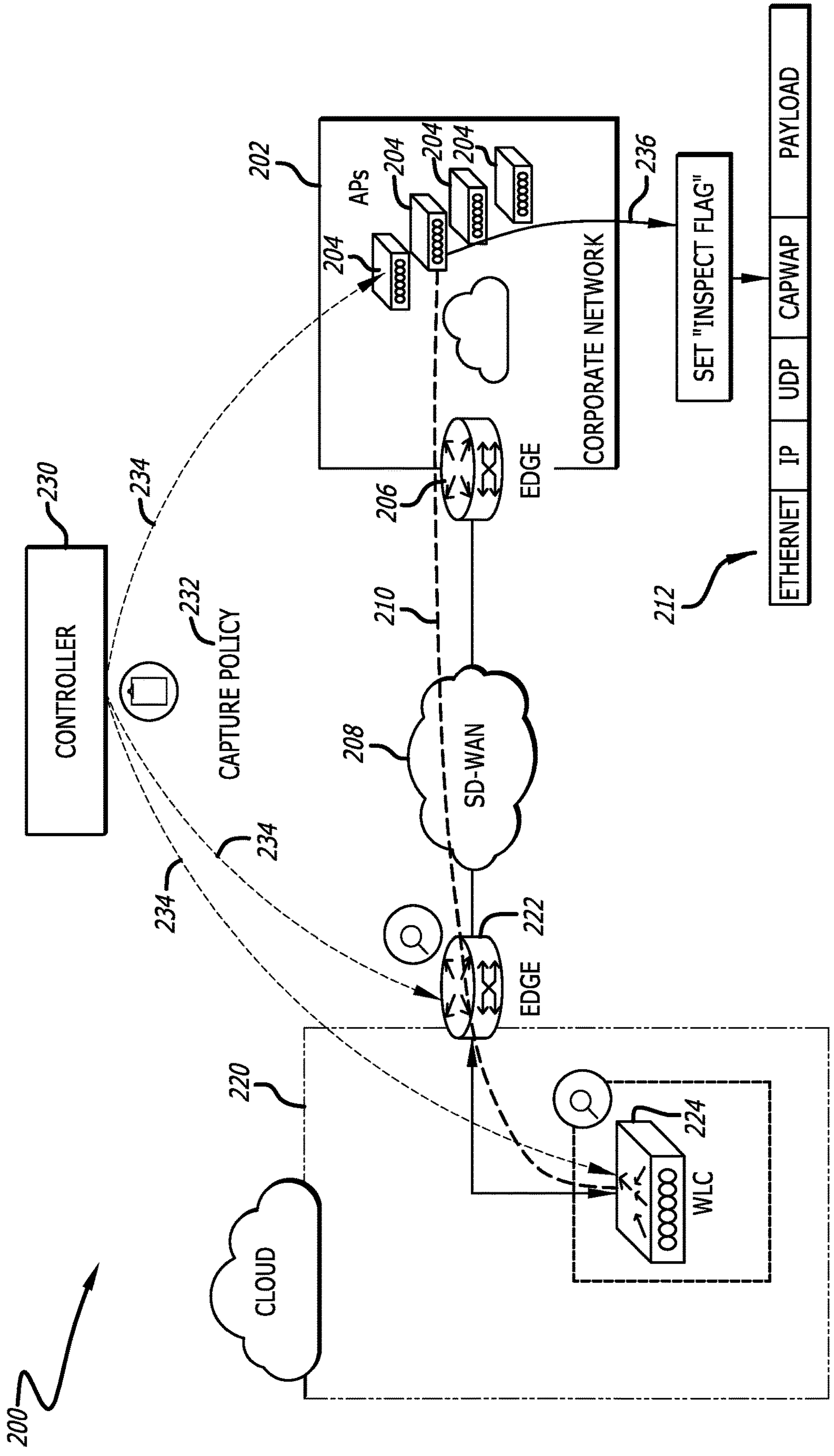
FIG. 2 is a diagram illustrating a network architecture with a controller device implementing capture policies in accordance with various embodiments of the disclosure.

Referring to FIG. 2, a diagram illustrating a network architecture 200 with a controller device implementing capture policies in accordance with various embodiments of the disclosure is shown. The embodiments shown in FIG. 2 may include a first domain 202, which can represent a (corporate) network comprising multiple APs 204. A second domain 220, located in a cloud, may include a WLC 224. In many embodiments, the first domain 202 and the second domain 220 can communicate with each other via an SD-WAN 208 through an edge router 206 of the first domain 202 and an edge router 222 of the second domain 220.

In a number of embodiments, a CAPWAP tunnel 210 may be established between the APs 204 and the WLC 224 via the edge router 206, the SD-WAN 208, and the edge router 222. CAPWAP packets 212 can be transmitted over the CAPWAP tunnel 210. In a variety of embodiments, each CAPWAP packet 212 may include, for instance, an Ethernet header, an IP header, a UDP header, a CAPWAP header, a dot11 header, and a payload. In some embodiments, a controller device 230 can generate capture policies 232, which may each include a filter field and an action field. The capture policies 232 can be dynamically updated based on current network conditions and needs (e.g., automatically determined or based on user inputs). In more embodiments, at 234, the controller device 230 may send indications of the capture policies 232 to one or more of the APs 204, the edge router 222, and/or the WLC 224.

In additional embodiments, based on the capture policies 232, at 236, the APs 204 may set an Inspect flag in a header of the CAPWAP packets 212 (e.g., in the CAPWAP header) that encapsulate wireless LAN (WLAN) frames from wireless client devices that match the capture policies 232. The APs can send the flagged CAPWAP packets 212 to the second domain 220 via the CAPWAP tunnel 210 as usual. In further embodiments, the edge router 222 and/or the WLC 224, based on the Inspect flag in the header of the CAPWAP packets 212 and the capture policies 232, may inspect WLAN frames or flows that are encapsulated in the flagged CAPWAP packets 212.

Although a specific embodiment for a network architecture with a controller device implementing capture policies is discussed with respect to FIG. 2, any of a variety of systems and/or processes may be utilized in accordance with embodiments of the disclosure. For example, the controller device can be equipped with machine learning capabilities to dynamically adjust the capture policies based on network traffic patterns. The elements depicted in FIG. 2 may also be interchangeable with other elements of FIGS. 1 and 3-9 as required to realize a particularly desired embodiment.

Figure 3:
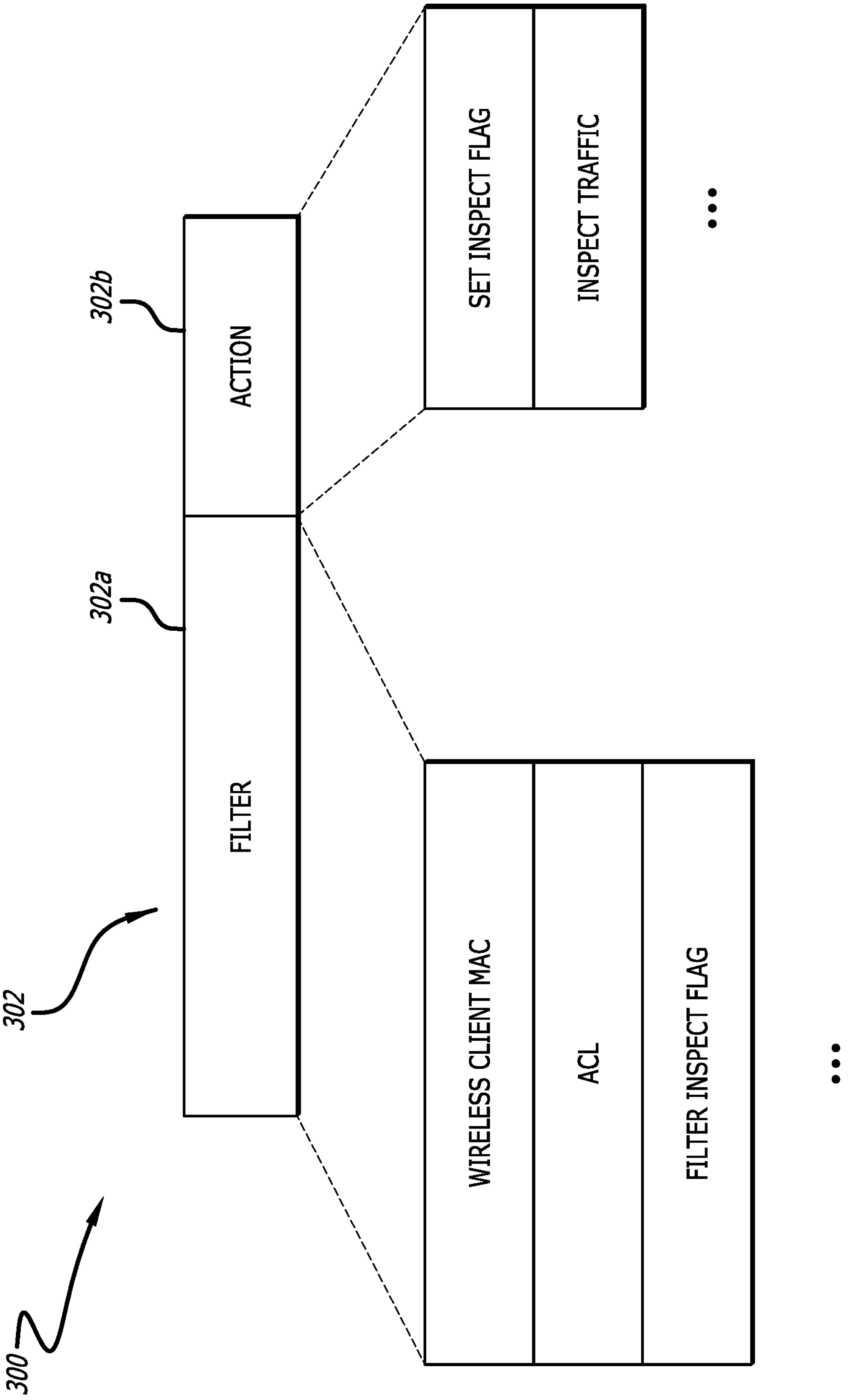
FIG. 3 is a diagram illustrating an example of a capture policy in accordance with various embodiments of the disclosure.

Referring to FIG. 3, a diagram 300 illustrating an example of a capture policy in accordance with various embodiments of the disclosure is shown. As shown, in many embodiments, an example capture policy 302 may include a filter field (or portion) 302*a* and an action field (or portion) 302*b*. The capture policy 302 may correspond to one of the capture policies 232 depicted in FIG. 2 and described above. In a number of embodiments, for a capture policy 302 to be utilized at an AP, the filter field 302*a* may include a wireless client MAC address or an ACL. An ACL may be a set of rules that controls network traffic and specifies which traffic is to be allowed or denied. In a variety of embodiments, the ACL can be associated with DHCP or IPV6ND protocols and messages. In some embodiments, the action field 302*b* may include setting an Inspect flag. In more embodiments, the action field 302*b* may also include inspecting the traffic. Accordingly, in a non-limiting example, based on a capture policy, an AP may find a WLAN frame that matches the wireless client MAC address specified in the filter field (e.g., the WLAN frame may be sent by the specific wireless client), and may, in accordance with the action field, set an Inspect flag in the CAPWAP packet that encapsulates the WLAN frame.

In additional embodiments, for a capture policy 302 to be utilized at a WLC or an associated edge router/device, the filter field 302*a* may include an indication of the Inspect flag. The action field 302*b* in this case may include inspecting the traffic. Accordingly, in a non-limiting example, based on a capture policy, a WLC or an edge router may find a CAPWAP packet (e.g., received from an AP via a CAPWAP tunnel) that includes the Inspect flag in a header (e.g., the CAPWAP header), as specified by the filter field, and may, in accordance with the action field, inspect the WLAN frame or flow encapsulated in the CAPWAP packet.

Although a specific embodiment for a capture policy suitable for carrying out the various steps, processes, methods, and operations described herein is discussed with respect to FIG. 3, any of a variety of systems and/or processes may be utilized in accordance with embodiments of the disclosure. For example, the filter field can be expanded to include other parameters such as the type of traffic or the time of day. The elements depicted in FIG. 3 may also be interchangeable with other elements of FIGS. 1, 2, and 4-9 as required to realize a particularly desired embodiment.

Figure 4:
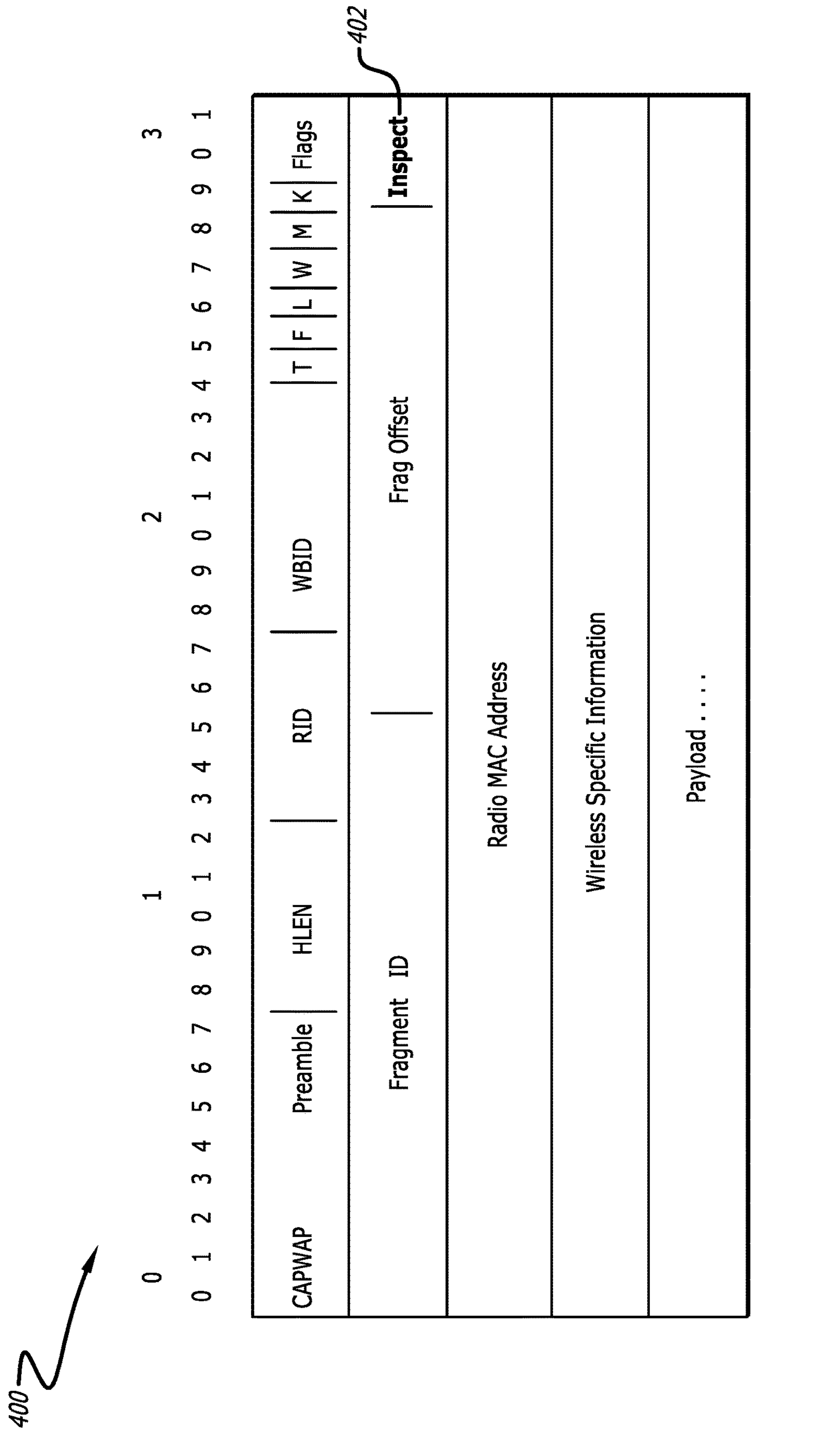
FIG. 4 is a diagram illustrating an example of a control and provisioning of wireless access points (CAPWAP) header in accordance with various embodiments of the disclosure.

Referring to FIG. 4, a diagram illustrating an example of a CAPWAP header 400 in accordance with various embodiments of the disclosure is shown. In the embodiments shown in FIG. 4, the CAPWAP header 400 may be included in a CAPWAP packet (e.g., the CAPWAP packet 212 as depicted in FIG. 2). In many embodiments, the CAPWAP header 400 can precede the CAPWAP payload, and can include several fields. In a number of embodiments, the CAPWAP header 400 may include a CAPWAP preamble, which may be a sequence of bits used to indicate the start of a packet. The HLEN may be the header length field, which can specify the length of the CAPWAP header. The RID may be the radio identifier (ID) field, which can identify the radio for which the packet is intended. Further, the WBID may be the wireless binding ID field, which can identify the wireless technology in use. The T/F/L/W/M/K flags may be various control flags used in the CAPWAP protocol. The fragment ID may be utilized to identify fragments of a larger packet, and the fragment (frag) offset can be utilized to specify the position of a fragment within the larger packet.

In a variety of embodiments, the Inspect flag 402, as described in association with the various embodiments herein, when set, may be utilized to indicate that the payload encapsulated in the CAPWAP packet should be inspected. In some embodiments, the radio MAC address may be the MAC address of the radio for which the packet is intended. In more embodiments, the wireless specific information field can contain additional data specific to the wireless technology in use.

Although a specific embodiment for a CAPWAP header suitable for carrying out the various steps, processes, methods, and operations described herein is discussed with respect to FIG. 4, any of a variety of systems and/or processes may be utilized in accordance with embodiments of the disclosure. For example, additional flags can be added to the CAPWAP header to provide more granular control over packet handling. The elements depicted in FIG. 4 may also be interchangeable with other elements of FIGS. 1-3 and 5-9 as required to realize a particularly desired embodiment.

Figure 5:
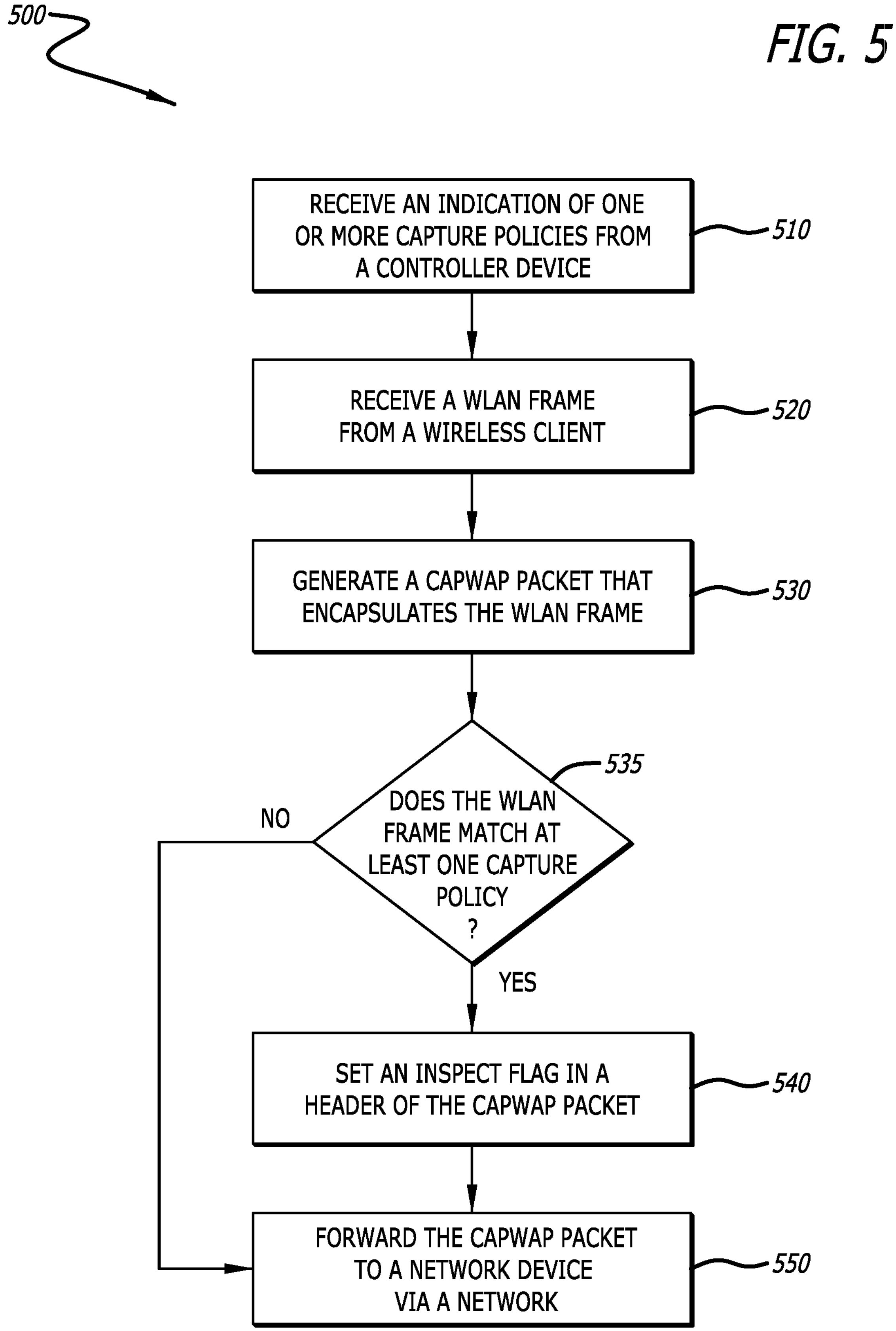
FIG. 5 is a flowchart showing a process for managing wireless local area network (WLAN) traffic in accordance with various embodiments of the disclosure.

Referring to FIG. 5, a flowchart showing a process 500 for managing WLAN traffic in accordance with various embodiments of the disclosure is shown. In many embodiments, the process 500 may receive an indication of one or more capture policies from a controller device (block 510). This can involve a controller device sending the capture policies to an AP. In a number of embodiments, the capture policies may each include a filter portion and an action portion.

In a variety of embodiments, the process 500 may receive a WLAN frame from a wireless client (block 520). This may involve the wireless client sending data to the AP. The WLAN frame can contain various types of data, such as voice, video, or other application data. The process of receiving the WLAN frame may also involve performing various operations such as, but not limited to, error checking, decryption, and de-encapsulation.

In some embodiments, the process 500 may generate a CAPWAP packet that encapsulates the WLAN frame (block 530). The CAPWAP packet can includes multiple headers and a payload, with the payload containing the encapsulated WLAN frame. The generation of the CAPWAP packet may also involve adding other data to the CAPWAP header, such as, but not limited to, sequence numbers, timestamps, or other control data.

In more embodiments, the process 500 can determine whether the WLAN frame matches at least one capture policy (block 535). This may involve comparing parameters of the WLAN frame, such as the source or destination MAC address, with the parameters specified in the capture policies. In response to the WLAN frame matching at least one capture policy, in additional embodiments, the process 500 can set an Inspect flag in a header of the CAPWAP packet (block 540). On the other hand, if the WLAN frame does not match any capture policy, in further embodiments, the process 500 may proceed to forward the CAPWAP packet to a network device (e.g., an edge device, such as an edge router, or a WLC) via a network (block 550).

In response to the WLAN frame matching at least one capture policy, in still more embodiments, the process 500 can set an Inspect flag in a header of the CAPWAP packet (block 540). The Inspect flag may indicate that the encapsulated WLAN frame should be inspected by the edge device or the WLC. The Inspect flag, once set, can trigger specific actions at the edge device or the WLC, such as, but not limited to, deep packet inspection or logging of the encapsulated WLAN frame for further analysis.

In still further embodiments, the process 500 may forward the CAPWAP packet to a network device (e.g., an edge device or a WLC) via a network (block 550). This can involve transmitting the CAPWAP packet over an SD-WAN (in particular, over a CAPWAP tunnel) to the edge device or the WLC for further processing. The forwarding of the CAPWAP packet may be done utilizing various routing protocols and techniques, depending on the configuration and needs of the network.

Although a specific embodiment for managing WLAN traffic suitable for carrying out the various steps, processes, methods, and operations described herein is discussed with respect to FIG. 5, any of a variety of systems and/or processes may be utilized in accordance with embodiments of the disclosure. For example, the controller device may be a cloud-based controller, allowing for centralized management and real-time updates of capture policies across multiple APs in different geographical locations. The elements depicted in FIG. 5 may also be interchangeable with other elements of FIGS. 1-4 and 6-9 as required to realize a particularly desired embodiment.

Figure 6:
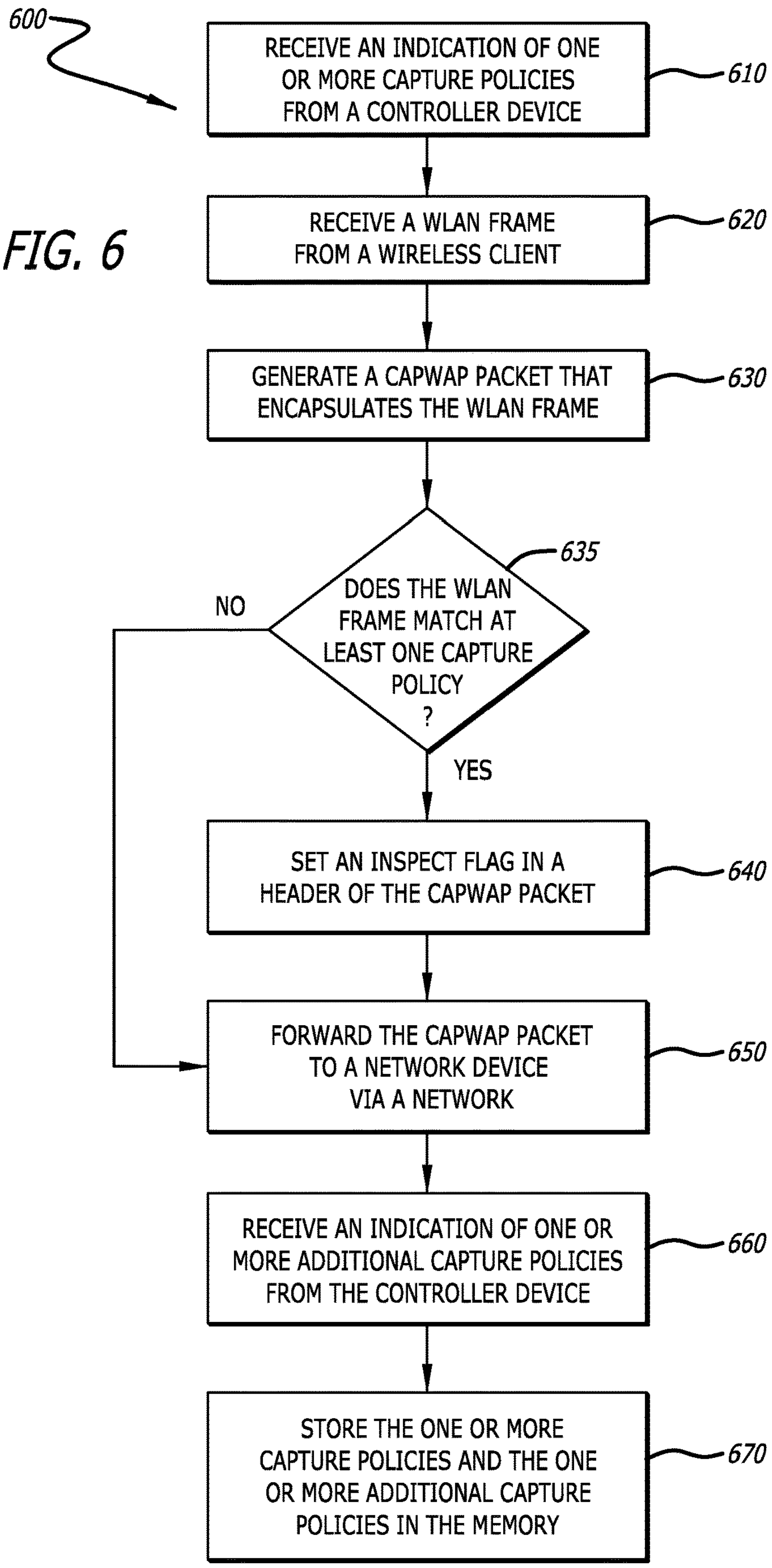
FIG. 6 is a flowchart showing a process for managing WLAN traffic in accordance with various embodiments of the disclosure.

Referring to FIG. 6, a flowchart showing a process 600 for managing WLAN traffic in accordance with various embodiments of the disclosure is shown. In many embodiments, the process 600 may receive an indication of one or more capture policies from a controller device (block 610). This can involve the controller device sending the capture policies to an AP. The capture policies can each include a filter portion and an action portion.

In a number of embodiments, the process 600 may receive a WLAN frame from a wireless client (block 620). This can involve the wireless client sending data to the AP. The WLAN frame may contain various types of data, such as, but not limited to, voice, video, or other application data. The process of receiving the WLAN frame may also involve performing various operations such as, but not limited to, error checking, decryption, and de-encapsulation.

In a variety of embodiments, the process 600 may generate a CAPWAP packet that encapsulates the WLAN frame (block 630). The CAPWAP packet can include multiple headers (which can include a CAPWAP header) and a payload, with the payload containing the encapsulated WLAN frame. The generation of the CAPWAP packet may also involve adding other data to the CAPWAP header, such as, but not limited to, sequence numbers, timestamps, or other control data.

In some embodiments, the process 600 can determine if the WLAN frame matches at least one capture policy (block 635). This may involve comparing parameters of the WLAN frame, such as, but not limited to, the source or destination MAC address, with the parameters specified in the capture policies. In response to the WLAN frame matching at least one capture policy, in more embodiments, the process 600 can set an Inspect flag in a header of the CAPWAP packet (block 640). On the other hand, if the WLAN frame does not match any capture policy, in additional embodiments, the process 600 may proceed to forward the CAPWAP packet to a network device (e.g., an edge device or a WLC) via a network (block 650).

In response to the WLAN frame matching at least one capture policy, in further embodiments, the process 600 can set an Inspect flag in a header of the CAPWAP packet (block 640). The Inspect flag may indicate that the encapsulated WLAN frame should be inspected by the edge device or the WLC. The Inspect flag, once set, can trigger specific actions at the edge device or the WLC such as, but not limited to, deep packet inspection or logging of the encapsulated WLAN frame for further analysis.

In still more embodiments, the process 600 may forward the CAPWAP packet to a network device (e.g., an edge device or a WLC) via a network (block 650). This can involve transmitting the CAPWAP packet over an SD-WAN (in particular, over a CAPWAP tunnel) to the edge device or the WLC for further processing. The forwarding of the CAPWAP packet may be done using various routing protocols and techniques, depending on the configuration and needs of the network.

In still further embodiments, the process 600 may receive an indication of one or more additional capture policies from the controller device (block 660). This can involve the controller device sending updated or additional capture policies to the AP. The additional capture policies may be utilized to enhance or modify the granularity or scope of the traffic inspection process.

In still additional embodiments, the process 600 may store the one or more capture policies and the one or more additional capture policies in the memory (block 670). This can involve writing the capture policies to a memory area accessible by the processor. Storing the capture policies can allow the capture policies to be retrieved and applied when the AP processes incoming WLAN frames.

Although a specific embodiment for managing WLAN traffic suitable for carrying out the various steps, processes, methods, and operations described herein is discussed with respect to FIG. 6, any of a variety of systems and/or processes may be utilized in accordance with embodiments of the disclosure. For example, the AP may be a next-generation AP with enhanced processing capabilities, enabling it to handle a high volume of WLAN frames and manage a large set of capture policies. The elements depicted in FIG. 6 may also be interchangeable with other elements of FIGS. 1-5 and 7-9 as required to realize a particularly desired embodiment.

Figure 7:
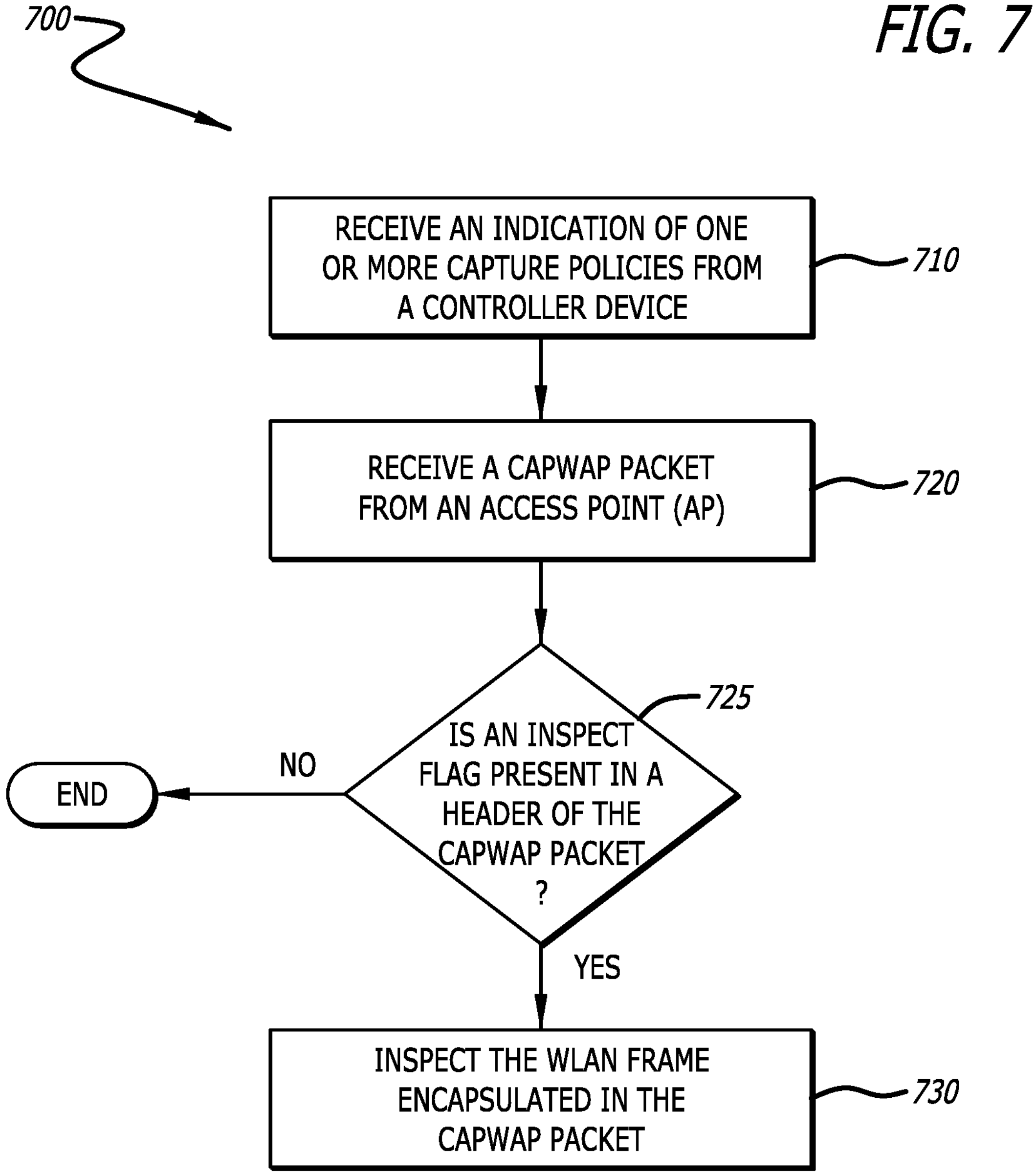
FIG. 7 is a flowchart showing a process for inspecting WLAN traffic in accordance with various embodiments of the disclosure.

Referring to FIG. 7, a flowchart showing a process 700 for inspecting WLAN traffic in accordance with various embodiments of the disclosure is shown. In many embodiments, the process 700 may receive an indication of one or more capture policies from a controller device (block 710). This can involve a controller device sending the capture policies to an edge device or a WLC. The capture policies may each include a filter portion and an action portion.

In a number of embodiments, the process 700 may receive a CAPWAP packet from an AP (block 720). The CAPWAP packet can encapsulate a WLAN frame. Receiving the CAPWAP packet may involve the AP sending the CAPWAP packet to the edge device or the WLC over a network, such as an SD-WAN. The CAPWAP packet can include multiple headers (including a CAPWAP header) and a payload, with the payload containing the encapsulated WLAN frame.

In a variety of embodiments, the process 700 can determine if an Inspect flag is present in a header of the CAPWAP packet (block 725). This may involve examining the CAPWAP header to check for the presence of the Inspect flag. The Inspect flag, if present, indicates that the encapsulated WLAN frame should be inspected based on the matched capture policy. In response to the Inspect flag being present in the CAPWAP header, in some embodiments, the process 700 can inspect the WLAN frame encapsulated in the CAPWAP packet (block 730). On the other hand, if no Inspect flag is present in the CAPWAP header, in more embodiments, the process 700 may process the CAPWAP packet as usual without additional inspection.

In response to the Inspect flag being present in the CAPWAP header, in additional embodiments, the process 700 can inspect the WLAN frame encapsulated in the CAPWAP packet (block 730). This may involve performing deep packet inspection or other analysis on the encapsulated WLAN frame. The inspection process can also involve logging the details of the inspected WLAN frame for future reference or for generating network traffic reports.

Although a specific embodiment for inspecting WLAN traffic suitable for carrying out the various steps, processes, methods, and operations described herein is discussed with respect to FIG. 7, any of a variety of systems and/or processes may be utilized in accordance with embodiments of the disclosure. For example, the edge device or the WLC may be equipped with advanced inspection capabilities, such as, but not limited to, machine learning processes or heuristic analysis tools, to provide more accurate and efficient inspection of the encapsulated WLAN frames. The elements depicted in FIG. 7 may also be interchangeable with other elements of FIGS. 1-6, 8, and 9 as required to realize a particularly desired embodiment.

Figure 8:
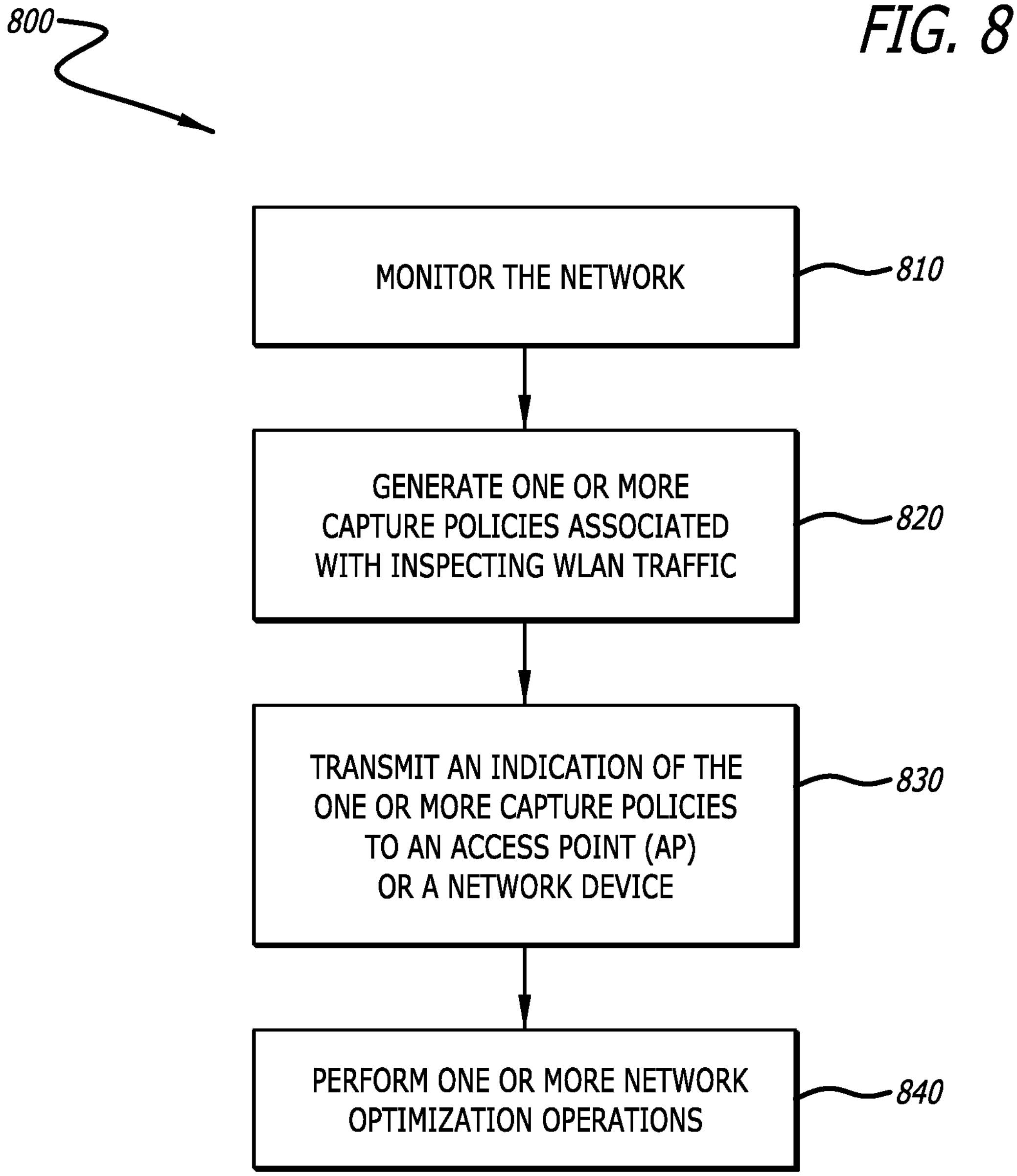
FIG. 8 is a flowchart showing a process for generating and managing capture policies in accordance with various embodiments of the disclosure.

Referring to FIG. 8, a flowchart showing a process 800 for generating and managing capture policies in accordance with various embodiments of the disclosure is shown. In many embodiments, the process 800 may monitor the network (block 810). This can involve a controller device continuously observing the network traffic, network performance metrics, or other network parameters to identify any issues or trends. The monitoring process may involve collecting various types of network data, such as, but not limited to, traffic volume, packet loss rate, latency, or other performance metrics, to provide a comprehensive view of the network status.

In a number of embodiments, the process 800 may generate one or more capture policies associated with inspecting WLAN traffic (block 820). In a variety of embodiments, this can involve the controller device analyzing the monitored network data and creating capture policies based on the analysis. In some embodiments, the capture policies may be generated based on user inputs or requests. The capture policies may include various parameters for identifying and handling specific types of network traffic. In more embodiments, the capture policies can each include a filter portion and an action portion.

In additional embodiments, the process 800 may transmit an indication of the one or more capture policies to an AP or a network device (e.g., an edge device or an WLC) (block 830). This can involve the controller device sending the capture policies to the AP, and/or to the edge device and/or the WLC. The transmitted capture policies can guide these devices on how to handle specific types of network traffic.

In further embodiments, the process 800 may perform one or more network optimization operations (block 840). This can involve the controller device implementing various strategies to improve the performance of the network, such as adjusting network configurations, balancing network loads, or rerouting network traffic. The network optimization operations may also include proactive measures such as predicting potential network issues based on historical data and taking preventive actions to avoid them.

Although a specific embodiment for a process of generating and managing capture policies suitable for carrying out the various steps, processes, methods, and operations described herein is discussed with respect to FIG. 8, any of a variety of systems and/or processes may be utilized in accordance with embodiments of the disclosure. For example, the controller device can be a cloud-based controller with advanced analytics capabilities, enabling it to generate more effective capture policies. The elements depicted in FIG. 8 may also be interchangeable with other elements of FIGS. 1-7 and 9 as required to realize a particularly desired embodiment.

Figure 9:
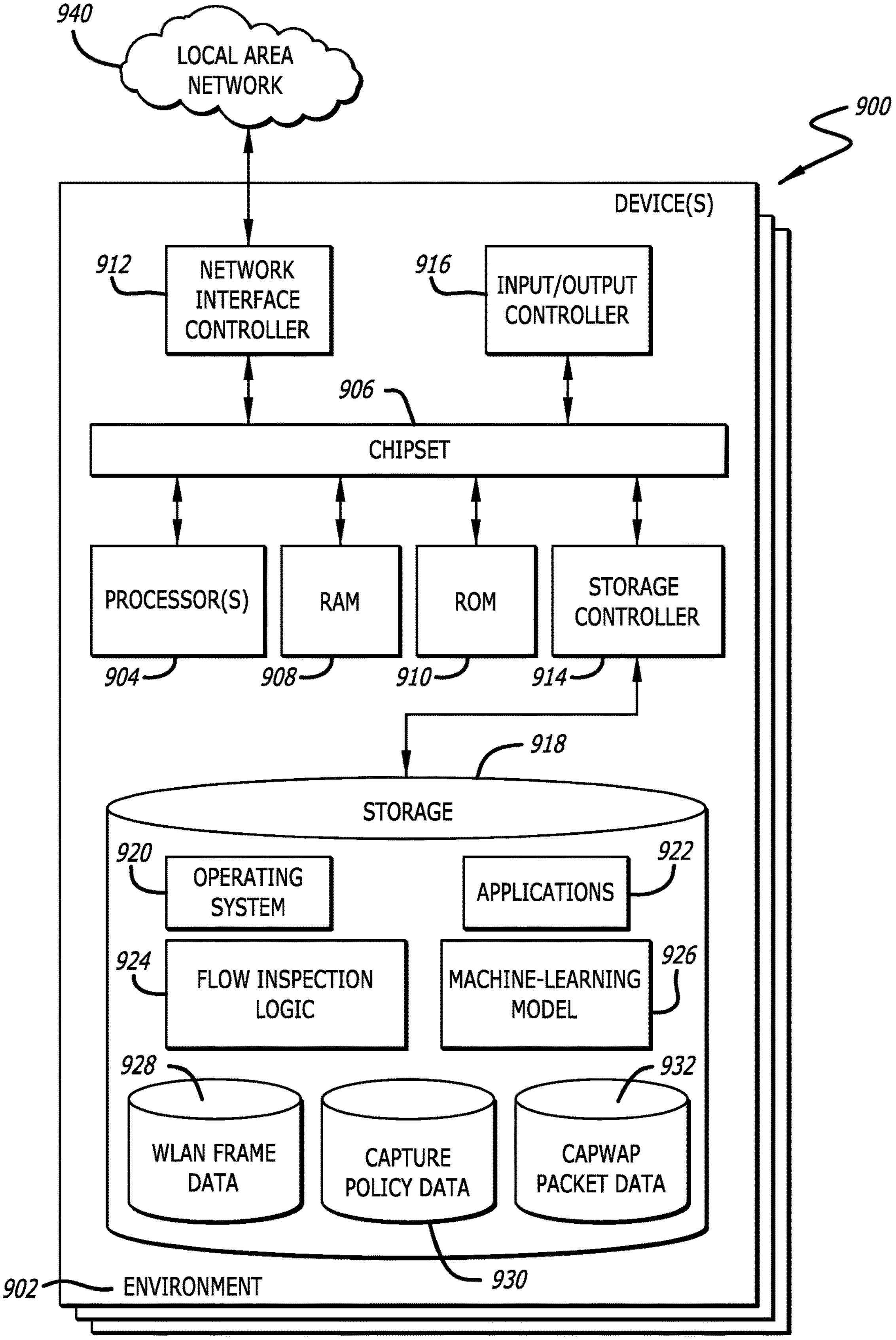
FIG. 9 is a conceptual block diagram for one or more devices capable of executing components and logic for implementing the functionality and embodiments described above.

Referring to FIG. 9, a conceptual block diagram for one or more devices 900 capable of executing components and logic for implementing the functionality and embodiments described above is shown. The embodiment of the conceptual block diagram depicted in FIG. 9 can illustrate a conventional server computer, workstation, desktop computer, laptop, tablet, network appliance, e-reader, smartphone, or other computing device, and can be utilized to execute any of the application and/or logic components presented herein. The device 900 may, in some examples, correspond to physical devices or to virtual resources described herein.

In many embodiments, the device 900 may include an environment 902 such as a baseboard or "motherboard," in physical embodiments that can be configured as a printed circuit board with a multitude of components or devices connected by way of a system bus or other electrical communication paths. Conceptually, in virtualized embodiments, the environment 902 may be a virtual environment that encompasses and executes the remaining components and resources of the device 900. In more embodiments, one or more processors 904, such as, but not limited to, central processing units ("CPUs") can be configured to operate in conjunction with a chipset 906. The processor(s) 904 can be standard programmable CPUs that perform arithmetic and logical operations necessary for the operation of the device 900.

In additional embodiments, the processor(s) 904 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 906 may provide an interface between the processor(s) 904 and the remainder of the components and devices within the environment 902. The chipset 906 can provide an interface to a random-access memory ("RAM") 908, which can be used as the main memory in the device 900 in some embodiments. The chipset 906 can further be configured to provide an interface to a computer-readable storage medium such as a read-only memory ("ROM") 910 or non-volatile RAM ("NVRAM") for storing basic routines that can help with various tasks such as, but not limited to, starting up the device 900 and/or transferring information between the various components and devices. The ROM 910 or NVRAM can also store other application components necessary for the operation of the device 900 in accordance with various embodiments described herein.

Different embodiments of the device 900 can be configured to operate in a networked environment using logical connections to remote computing devices and computer systems through a network, such as the network 940. The chipset 906 can include functionality for providing network connectivity through a network interface card ("NIC") 912, which may comprise a gigabit Ethernet adapter or similar component. The NIC 912 can be capable of connecting the device 900 to other devices over the network 940. It is contemplated that multiple NICs 912 may be present in the device 900, connecting the device to other types of networks and remote systems.

In further embodiments, the device 900 can be connected to a storage 918 that provides non-volatile storage for data accessible by the device 900. The storage 918 can, for example, store an operating system 920, applications 922, and WLAN frame data 928, capture policy data 930, and CAPWAP packet data 932, which are described in greater detail below. The storage 918 can be connected to the environment 902 through a storage controller 914 connected to the chipset 906. In certain embodiments, the storage 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 900 can store data within the storage 918 by transforming the physical state of the physical storage units to reflect the information being stored. The specific transformation of physical state can depend on various factors. Examples of such factors can include, but are not limited to, the technology used to implement the physical storage units, whether the storage 918 is characterized as primary or secondary storage, and the like.

For example, the device 900 can store information within the storage 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 900 can further read or access information from the storage 918 by detecting the physical states or characteristics of one or more particular locations within the physical storage units.

In addition to the storage 918 described above, the device 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 900. In some examples, the operations performed by a cloud computing network, and or any components included therein, may be supported by one or more devices similar to device 900. Stated otherwise, some or all of the operations performed by the cloud computing network, and or any components included therein, may be performed by one or more devices 900 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 918 can store an operating system 920 utilized to control the operation of the device 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 918 can store other system or application programs and data utilized by the device 900.

In various embodiment, the storage 918 or other computer-readable storage media is encoded with computer-executable instructions which, when loaded into the device 900, may transform it from a general-purpose computing system into a special-purpose computer capable of implementing the embodiments described herein. These computer-executable instructions may be stored as application 922 and transform the device 900 by specifying how the processor(s) 904 can transition between states, as described above. In some embodiments, the device 900 has access to computer-readable storage media storing computer-executable instructions which, when executed by the device 900, perform the various processes described above with regard to FIGS. 1-8. In more embodiments, the device 900 can also include computer-readable storage media having instructions stored thereupon for performing any of the other computer-implemented operations described herein.

In still further embodiments, the device 900 can also include one or more input/output controllers 916 for receiving and processing input from a number of input devices, such as a keyboard, a mouse, a touchpad, a touch screen, an electronic stylus, or other type of input device. Similarly, an input/output controller 916 can be configured to provide output to a display, such as a computer monitor, a flat panel display, a digital projector, a printer, or other type of output device. Those skilled in the art will recognize that the device 900 might not include all of the components shown in FIG. 9, and can include other components that are not explicitly shown in FIG. 9, or might utilize an architecture completely different than that shown in FIG. 9.

As described above, the device 900 may support a virtualization layer, such as one or more virtual resources executing on the device 900. In some examples, the virtualization layer may be supported by a hypervisor that provides one or more virtual machines running on the device 900 to perform functions described herein. The virtualization layer may generally support a virtual resource that performs at least a portion of the techniques described herein.

In many embodiments, the device 900 can include a flow inspection logic 924. The flow inspection logic 924 may be a component that can be part of a network device, such as an edge device/router or a WLC. The flow inspection logic 924 can inspect the WLAN frames encapsulated in CAPWAP packets based on the capture policies. This may involve performing deep packet inspection or other analysis on the encapsulated WLAN frames.

In a number of embodiments, the storage 918 can include WLAN frame data 928. The WLAN frame data 928 may be the data transmitted by a wireless client to an AP. The WLAN frame data 928 can contain various types of data, such as voice, video, or other application data. The WLAN frame data 928 may be encapsulated in a CAPWAP packet for transmission over the network.

In various embodiments, the storage 918 can include capture policy data 930. The capture policy data 930 may include parameters or rules received from the controller device. The capture policy data 930 can guide the AP on how to handle specific types of network traffic. The capture policy data 930 may include parameters for identifying and handling specific types of network traffic, such as, but not limited to, the source or destination MAC address, IP address, port number, or protocol type.

In still more embodiments, the storage 918 can include CAPWAP packet data 932. The CAPWAP packet data 932 may be encapsulated in a CAPWAP packet, which can include multiple headers and a payload. The payload may contain the WLAN frame data, while the headers may include control data such as sequence numbers, timestamps, and an Inspect flag.

Finally, in many embodiments, data may be processed into a format usable by a machine-learning model 926 (e.g., feature vectors), and or other pre-processing techniques. The machine-learning ("ML") model 926 may be any type of ML model, such as supervised models, reinforcement models, and/or unsupervised models. The ML model 926 may include one or more of linear regression models, logistic regression models, decision trees, Naïve Bayes models, neural networks, k-means cluster models, random forest models, and/or other types of ML models 926. The ML model 926 may be configured to analyze the inspected WLAN frames, learn from the patterns and trends in the network traffic, and provide insights or predictions that can be utilized to enhance the capture policies and improve the overall network performance.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device associated with a first network domain, comprising:

a processor;

at least one network interface controller configured to provide access to a network; and a memory communicatively coupled to the processor, wherein the memory comprises a flow inspection logic that is configured to:

receive an indication of one or more capture policies;

receive a wireless local area network (WLAN) frame;

generate a control and provisioning of wireless access points (CAPWAP) packet, the CAPWAP packet encapsulating the WLAN frame;

identify whether the WLAN frame matches at least one capture policy of the one or more capture policies;

set an Inspect flag in a header of the CAPWAP packet; and forward the CAPWAP packet to a network device associated with a second network domain configured to communicate with the first network domain via a software-defined wide area network (SD-WAN).

2. The device of claim 1, wherein the indication of the one or more capture policies is received from a controller device.

3. The device of claim 1, wherein the WLAN frame is received from a wireless client.

4. The device of claim 1, wherein the Inspect flag is set in response to the WLAN frame matching the at least one capture policy.

5. The device of claim 1, wherein the network device includes an edge device or a wireless local area network controller (WLC).

6. The device of claim 1, wherein each capture policy in the one or more capture policies includes a filter portion and an action portion.

7. The device of claim 6, wherein a filter portion of a capture policy in the one or more capture policies includes a wireless client medium access control (MAC) address, and an action portion of the capture policy includes setting the Inspect flag.

8. The device of claim 6, wherein a filter portion of a capture policy in the one or more capture policies includes an access control list (ACL), and an action portion of the capture policy includes setting the Inspect flag and inspecting a flow.

9. The device of claim 8, wherein the ACL is associated with one or more dynamic host configuration protocol (DHCP) messages or one or more internet protocol version 6 neighbor discovery (IPv6ND) messages.

10. The device of claim 1, wherein the flow inspection logic is further configured to:

receive an indication of one or more additional capture policies from a controller device; and store the one or more capture policies and the one or more additional capture policies in the memory.

11. The device of claim 1, wherein the device includes an access point (AP).

12. A device associated with a first network domain, comprising:

a processor;

at least one network interface controller configured to provide access to a network; and a memory communicatively coupled to the processor, wherein the memory comprises a flow inspection logic that is configured to:

receive a control and provisioning of wireless access points (CAPWAP) packet from an access point associated with a second network domain configured to communicate via a software-defined wide area network (SD-WAN), the CAPWAP packet encapsulating a wireless local area network (WLAN) frame;

identify whether an Inspect flag is present in a header of the CAPWAP packet; and inspect the WLAN frame encapsulated in the CAPWAP packet in response to a presence of the Inspect flag in the header of the CAPWAP packet.

13. The device of claim 12, wherein the flow inspection logic is further configured to receive an indication of one or more capture policies from a controller device, and wherein the identifying of whether the Inspect flag is present and the inspecting of the WLAN frame are based on at least one capture policy of the one or more capture policies.

14. The device of claim 12, wherein the device includes an edge device or a wireless local area network controller (WLC).

15. A device, comprising:

a processor;

at least one network interface controller configured to provide access to a network; and a memory communicatively coupled to the processor, wherein the memory comprises a flow inspection logic that is configured to:

generate one or more capture policies associated with inspecting wireless local area network (WLAN) traffic, wherein an action portion of the one or more capture policies includes setting an inspect flag in a header of a control and provisioning of wireless action points (CAPWAP) packet; and transmit an indication of the one or more capture policies to at least one of an access point (AP) associated with a first network domain or a network device associated with a second network domain different from the first network domain, wherein the first network domain and the second network domain communicate with each other via a software-defined wide area network (SD-WAN).

16. The device of claim 15, wherein the indication of the one or more capture policies is transmitted to at least one of an access point (AP), an edge device or a wireless local area network controller (WLC).

17. The device of claim 15, wherein the device includes a controller device.

* * * * *